(12) United States Patent
Fu et al.

(10) Patent No.: US 10,930,074 B2
(45) Date of Patent: Feb. 23, 2021

(54) METHOD AND SYSTEM FOR REAL-TIME CONTROL OF THREE-DIMENSIONAL MODELS

(71) Applicant: APPMAGICS TECH (BEIJING) LIMITED, Beijing (CN)

(72) Inventors: Yingna Fu, Beijing (CN); Yulin Jin, Redmond, WA (US)

(73) Assignee: APPMAGICS TECH (BEIJING) LIMITED, Beijing (CN)

( * ) Notice: Subject to any disclaimer, the term of this patent is extended or adjusted under 35 U.S.C. 154(b) by 106 days.

(21) Appl. No.: 16/261,482

(22) Filed: Jan. 29, 2019

(65) Prior Publication Data

US 2019/0156574 A1 May 23, 2019

Related U.S. Application Data

(63) Continuation of application No. PCT/CN2017/081376, filed on Apr. 21, 2017.

(30) Foreign Application Priority Data

Jul. 29, 2016 (CN) .......................... 201610619560.4

(51) Int. Cl.
*G06T 19/00* (2011.01)
*G06K 9/00* (2006.01)
(Continued)

(52) U.S. Cl.
CPC ........ *G06T 19/003* (2013.01); *G06K 9/00201* (2013.01); *G06K 9/00228* (2013.01);
(Continued)

(58) Field of Classification Search
CPC ......... G06T 19/003; G06T 7/00; G06T 13/40; G06T 17/00; G06T 2200/08; G06T 19/20;
(Continued)

(56) References Cited

U.S. PATENT DOCUMENTS

| 2013/0235045 | A1* | 9/2013 | Corazza | ................. G06T 13/40 345/473 |
| 2016/0328628 | A1* | 11/2016 | Bhat | ....................... G06T 13/40 |
| 2017/0024921 | A1* | 1/2017 | Beeler | ..................... G06T 13/40 |

FOREIGN PATENT DOCUMENTS

| CN | 101086681 A | 12/2007 |
| CN | 101271520 A | 9/2008 |

(Continued)

OTHER PUBLICATIONS

Chinese Office Action for CN Application No. 201610619560.4 dated Jul. 29, 2016.
(Continued)

*Primary Examiner* — Ke Xiao
*Assistant Examiner* — Andrew Shin
(74) *Attorney, Agent, or Firm* — Flener IP & Business Law; Zareefa B. Flener

(57) ABSTRACT

Embodiments of the present application provide a method for real-time control of a three-dimensional model configured to solve technical issues that a real-time feedback for an actual object is not formed through limited resources in order to control an action of the three-dimensional model to form a live video in a mobile internet environment. The method includes: capturing a real-time video of an actual object; marking an action of the actual object in an image of the real-time video; and forming an action control instruction of a corresponding 3D model according to a change of the action that is marked.

24 Claims, 10 Drawing Sheets

(51) Int. Cl.
*G06T 17/00* (2006.01)
*G06T 13/40* (2011.01)
*H04N 21/2187* (2011.01)
*H04N 21/4223* (2011.01)
*H04N 21/44* (2011.01)
*H04N 21/234* (2011.01)
*G06T 7/00* (2017.01)
*H04N 21/4788* (2011.01)

(52) U.S. Cl.
CPC ............... *G06T 7/00* (2013.01); *G06T 13/40* (2013.01); *G06T 17/00* (2013.01); *H04N 21/2187* (2013.01); *H04N 21/23418* (2013.01); *H04N 21/4223* (2013.01); *H04N 21/44008* (2013.01); *H04N 21/4788* (2013.01); *G06T 2200/08* (2013.01)

(58) Field of Classification Search
CPC . G06T 13/20; G06T 13/205; G06T 2219/004; G06T 2207/20101; G06T 2207/30; G06T 2207/30196; G06T 2207/30201; G06T 2207/30204; G06T 2207/30208; G06K 9/00201; G06K 9/00228; G06K 9/00221; G06K 9/00248; G06K 9/00302; G06K 9/00335; H04N 21/2187; H04N 21/23418; H04N 21/4223; H04N 21/44008; H04N 21/4788
See application file for complete search history.

(56) References Cited

FOREIGN PATENT DOCUMENTS

| | | |
|---|---|---|
| CN | 101452582 A | 6/2009 |
| CN | 101763636 A | 6/2010 |
| CN | 105069830 A | 11/2015 |
| CN | 105338369 A | 2/2016 |
| CN | 105518714 A | 4/2016 |
| CN | 105528805 A | 4/2016 |
| CN | 106251396 A | 12/2016 |

OTHER PUBLICATIONS

International search report of PCT/CN2017/081376, dated Jul. 19, 2017.
Written Opinion of the international Searching Authority for PCT/CN2017/081376 dated Feb. 1, 2018.

* cited by examiner

METHOD AND SYSTEM FOR REAL-TIME CONTROL OF THREE-DIMENSIONAL MODELS

CROSS-REFERENCE TO RELATED APPLICATIONS

The present application is a continuation of the International Application No. PCT/CN2017/081376 filed on Apr. 21, 2017, which claims priority to Chinese patent application No. 201610619560.4 filed on Jul. 29, 2016. Both applications are incorporated herein by reference in their entireties.

TECHNICAL FIELD

The embodiments of present application relate to a method and system for control of a stereoscopic model, and more particularly to a method and system for real-time control of a three-dimensional model.

BACKGROUND

Live streaming or video interaction on audio visual equipment and mobile communication equipment has been very common, and the content of videos are often images of actual people. With the advancement of technologies in communications, sensors and modeling, the real-time interaction of three-dimensional character models is on the rise around the world. Prior technical solutions may involve that the images of actual people are replaced in real-time with virtual cartoon images, and real-time interactions between cartoon images replacing images of actual people are formed, and emotional expression such as happiness, anger, cry and laugh is captured correctly. For example, actual people to tell stories through live streaming is turned into cartoon characters to tell stories, and actual teachers to talk about physics is turned into famous scientists to talk about physics. Two strangers may perform video interaction by playing different roles respectively, for example, Snow White may perform video chat with Prince Charming.

In order to achieve above goals, we need to use bodies of actual people in the physical world, especially facial expression and actions, to control expression and actions of a three-dimensional model in the virtual world in order to enable the linkage.

However, as a very popular and novel field around the world, in the prior technical solutions, the application of controlling the three-dimensional model based on body actions of actual people, especially expression and actions of actual people has obvious technical defects in the mobile internet field.

For example, in a prior art, as for actual objects of the head and face, it is necessary to resort to a high-definition webcam of a professional device, and keep a relatively fixed position relative to the face, and combine the manner of pasted points on the face to achieve a high-accuracy expression control, and the position of a camera relative to the face is fixed and remains vertical. Motion of the camera relative to the face is avoided when people turn their heads by fixing relative position of the camera and the face in the present technical solutions. However, when the face is pointing to the camera of a mobile device by utilizing a webcam of a mobile device, rotation of the head may cause the webcam to be no longer perpendicular to the face, so that facial action expression is not captured accurately.

In another prior art, Stanford University computer department uses a RGBD webcam and resorts to depth information provided by the camera to achieve similar functions. However, most mobile devices today are equipped with a RGB webcam without the depth information, so that an algorithm may not be spread to a wider mobile internet scenario.

In another prior art, similar functions are achieved based on the RGB webcam on a PC computer by Face Rig and Adobe technologies. However, it is not easy to make real-time effects due to limited computing capability of mobile devices.

Since it may be seen that in the prior art, none of the three-dimensional model control methods based on expression and actions of actual people or relied on special video capture devices or relied on a powerful computing ability of computers is a real-time control of the three-dimensional model by only resorting to ordinary mobile devices (mobile phones).

SUMMARY

In view of this, embodiments of the present application provide a method for real-time control of a three-dimensional model configured to solve technical issues that a real-time feedback for an actual object may not be formed through limited computing resources of a device so as to control an action of the three-dimensional model to form a live video in a mobile internet environment.

Meanwhile, the embodiment of the present application further provides a system for real-time control of a three-dimensional model configured to solve technical issues that the action of the three-dimensional model of the actual object may not realize that a real-time action is controlled to form live video with constraints of hardware resources such as the mobile internet environment, a processing capability of a mobile device and performance of a webcam.

A method for real-time control of a three-dimensional model according to the present application, including: capturing a real-time video of an actual object; marking an action of the actual object in an image of the real-time video; and forming an action control instruction of a corresponding 3D model according to a change of the action that is marked.

A method for real-time control of a three-dimensional model according to the present application, including: capturing a real-time video of a head and a face in an actual object; locating a face region by utilizing a low-resolution copy of frame of images in a video; applying directly the face region on a corresponding copy of an adjacent frame of images; marking a face landmark in the face region of the frame of images or the corresponding copy; establishing a head orientation reference pattern, a face reference planar and a face reference pattern of the face reference planar by utilizing a position fixed landmark of a front view 2D face in an image, and forming a coordinate map relationship with a front view 3D head model; capturing rotation data of a head by measuring deformation of the head orientation reference pattern relative to the face reference pattern when the head of the adjacent frame of images is rotating; and forming a control instruction of an action expression of the head and the face in combination with a position change of a 2D face landmark of adjacent frames and the rotation data of the head.

A system for real-time control of a three-dimensional model according to the present application, including: a video capturing device, configured to obtain a real-time video of an actual object; an image marking device, configured to mark an action of the actual object in an image of the real-time video; and an action instruction generating device, configured to form an action control instruction of a corresponding 3D model according to a change of the action that is marked.

In the method for real-time control of a three-dimensional model according to the present application, an action control instruction for controlling a 3D model is formed by recognizing an actual object and a change of an action of the actual object in a real-time video obtained. The action control instruction as abstract data with a specific meaning has small data volume and a low requirement of bandwidth of data of real-time transmission, and real-time transmission performance in a mobile internet environment may be ensured. In the method for real-time control of a three-dimensional model according to the present application, the delay of transmission of a large amount of video data formed by a real-time render of the 3D model in the mobile internet environment and lag of broadcasting a formed VR video are avoided, so that a render generation process and a control generation process of the 3D model may be completed at both ends of the mobile internet environment. Recognition capture and instruction formation for the change of the action of the actual object are completed by utilizing a mobile device with limited hardware resources at one end, and download, load and activation of 3D models and scenarios that are necessary are completed by utilizing the mobile internet environment at another end. A corresponding action of the actual object is completed through a control instruction of real-time transmission by the 3D model, and a VR live streaming corresponding to a model render and a scenario render is formed.

System for real-time control of a three-dimensional model according to the present application may be deployed in a mobile device with limited resources in a mobile internet environment. A change process of an action of an actual object is processed centrally, by the system, by utilizing limited devices and webcams capabilities, an accurate action state of the actual object is efficiently obtained, and a control instruction based on a change of the action is formed. The control instruction may perform an accurate real-time action control for a 3D model arbitrarily matched, an actual expression of a real-time action of the actual object in the 3D model is completed. Thus an action control of the 3D model does not need to be fused in a video of the actual object, and a motion simulation for the actual object is no longer limited to limited bandwidth of the mobile internet environment.

DETAILED DESCRIPTION

Technical solutions in embodiments of the present application are clearly and completely described in the following with reference to accompanying drawings in the embodiments of the present application. Obviously, described embodiments are only a part of embodiments of the present application, and are not all embodiments. All other embodiments obtained by those skilled in the art based on the embodiments of the present application without creative efforts belong to protective scope of the present application.

Numbers of steps in drawings are only configured as reference signs of the steps, and do not indicate order of executions.

Figure 1A:
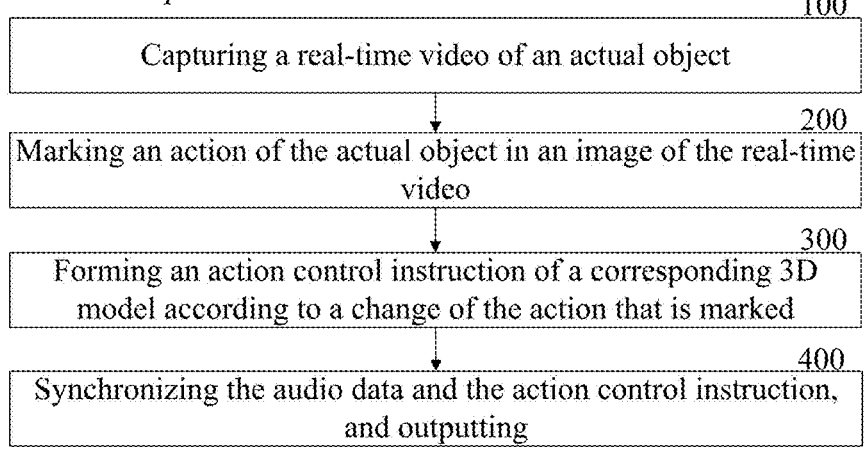
FIG. 1a is a processing flowchart of a method for real-time control of a three-dimensional model according to an embodiment of the present application.

FIG. 1a is a flowchart of a method for real-time control of a three-dimensional model according to an embodiment of the present application. The method is a control process independently completed by a content production end. As shown in FIG. 1a, the method includes:

Step 100: capturing a real-time video of an actual object.

The actual object described above includes a whole body, or a body, a head or a face of a body, and correspondingly includes body actions, head actions, and facial actions (expression).

Step 200: marking an action of the actual object in an image of the real-time video.

The marking includes recognizing the actual object, locating the actual object recognized, locating an action of the recognized actual object, and locating a change of the action of the actual object recognized. For example, the marking includes capturing (signing) and analyzing (recognizing) an action of the body or the head, or capturing (signing) and analyzing (recognizing) facial expression.

Step 300: forming an action control instruction of a corresponding 3D model according to a change of the action that is marked.

A change of the above (the action that is marked) includes a change of a locating state at the start and end for the action of the actual object recognized, and the change may be measurable or quantifiable.

The corresponding 3D model described above includes a 3D model of a VR object that forms the actual object, such as body model, head model or face model.

In the method for real-time control of a three-dimensional model according to the present application, an action control instruction for controlling a 3D model is formed by recognizing an actual object and a change of an action of the actual object in a real-time video obtained. The action control instruction as abstract data with a specific meaning has small data volume and a low requirement of bandwidth of data of real-time transmission, and real-time transmission performance in a mobile internet environment may be ensured.

The above steps are independently completed by a content production end, and an action control instruction formed may be buffered or stored as data. At a content consumption end, only a corresponding 3D model obtained needs to be invoked, and the corresponding 3D model is controlled according to the action control instruction received, so that the 3D model may be commanded to complete a corresponding action.

In a method for real-time control of the three-dimensional model according to another embodiment of the present application, when the system still has audio data to be transmitted simultaneously, and as shown in FIG. 1a, the method may further include the following step:

Step 400: synchronizing the audio data and the action control instruction, and outputting.

The synchronizing described above refers to that the action control instruction and the audio data within a unit time are given with a same reference point, a reference label or a time stamp, so that execution of the action control instruction and output of the audio data may be combined to form synchronization.

The step described above is for synchronizing the audio data accompanied by the action of the actual object with continuous action control instructions on the timeline so as to overcome data non-synchronization caused by processing delay during data processing procedure.

Figure 1B:
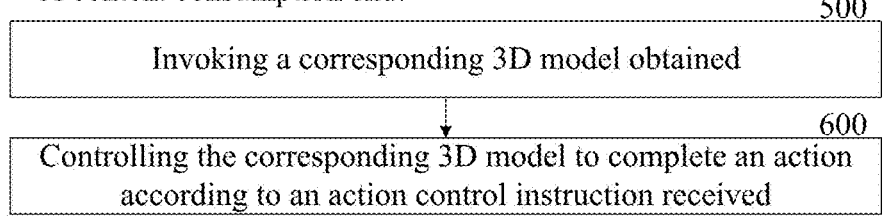
FIG. 1b is a processing flowchart of a method for real-time control of a three-dimensional model according to an embodiment of the present application.

FIG. 1b is a processing flowchart of a method for real-time control of a three-dimensional model according to an embodiment of the present application. The method includes a method that a content production end controls a 3D model by utilizing an action control instruction. As shown in FIG. 1b, the method includes:

Step 500: invoking a corresponding 3D model obtained.

Step 600: controlling the corresponding 3D model to complete an action according to an action control instruction received.

When received information further includes audio data accompanied by sound except for the action control instruction, in order to accurately match an action of the 3D model formed by the action control instruction with the audio data accompanied by sound, the step 600 may include: a step of receiving the audio data and the action control instruction; a step of catching the audio data and the action control instruction; a step of cooperating the audio data and the action control instruction; and a step of synchronously broadcasting an audio during process of completing the action by the corresponding 3D model.

The catching above is for overcoming delay of data caused by multi-path transmission of mobile internet.

In a method for real-time control of a three-dimensional model according to the embodiments, at a content production end, continuous real-time videos may be captured by utilizing a mobile device, and object recognition is performed to main actual objects thereof, and location is performed to an action of the actual object, and a change of the action is signed, and signed data of the change of the action are formed into continuous action control instructions.

Further, action control for the corresponding 3D model is completed by the action control instruction at a content consumption end. The amount of data of the action control instruction formed at the content production end is significantly lower than the amount of data of VR video formed after 3D model render, there are more advantageous for real-time transmission in a mobile internet environment, and quality of VR live streaming is ensured.

The content production end and the content consumption end may be deployed on different devices or multimedia devices in a local network, or may be deployed on different devices or multimedia devices at both ends of the mobile internet, and one content production end may correspond to a plurality of content consumption ends that are deployed on a far end of the local network or mobile internet.

Figure 2:
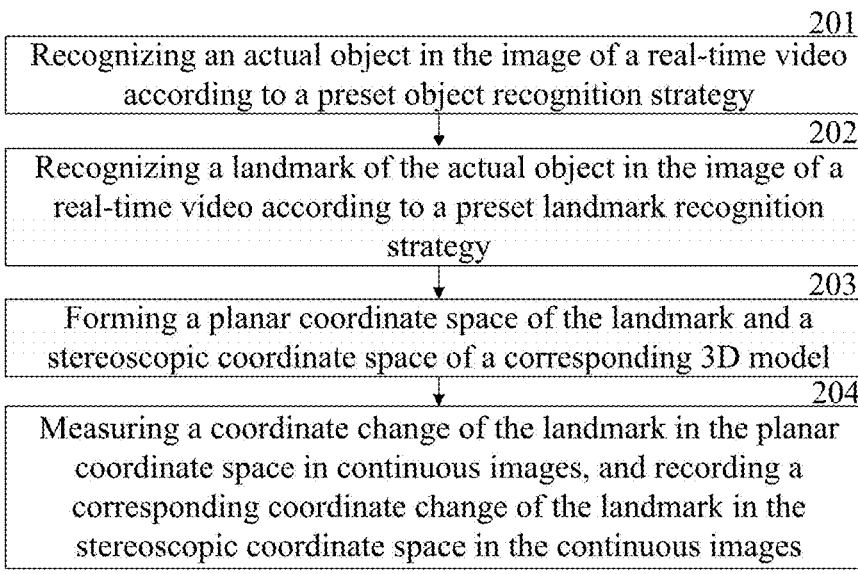
FIG. 2 is a flowchart of action recognition of a method for real-time control of a three-dimensional model according to an embodiment of the present application.

FIG. 2 is a flowchart of action recognition in a method for real-time control of a three-dimensional model according to an embodiment of the present application. As shown in FIG. 2, the step 200 shown in FIG. 1a includes the following steps:

Step 201: recognizing an actual object in the image of a real-time video according to a preset object recognition strategy.

Step 202: recognizing a landmark of the actual object in the image of a real-time video according to a preset landmark recognition strategy.

A position (coordinate) change of the landmark described above may reflect a change of a fine action of a particular object, for example, a position change of five sense organs (a landmark) of a head may reflect an action of the head, a position change of a joint (a landmark) of a body may reflect an action of a trunk, and a position change of a mouth angle, an eyebrow tip and a mouth type (landmark) of a face may reflect a facial expression.

Step 203: forming a planar coordinate space of the landmark and a stereoscopic coordinate space of a corresponding 3D model.

Step 204: measuring a coordinate change of the landmark in the planar coordinate space in continuous images, and recording a corresponding coordinate change of the landmark in the stereoscopic coordinate space in the continuous images.

In the method for real-time control of a three-dimensional model according to the embodiment of the embodiment, a specific object in an image, such as a body, a head, or a face, is recognized by utilizing an object recognition strategy, and a landmark closely related to a change of an action of the special object in the image is recognized by utilizing a landmark recognition strategy. By establishing an initial map relationship between a planar coordinate system of a 2D actual object in the image and a stereoscopic coordinate system of a corresponding 3D model, data of a position change of a landmark reflected in a 2D image may be transformed into data of the position change of the landmark of the corresponding 3D model.

In this case, a coordinate change of the landmark is formed into an action control instruction of the corresponding 3D model in the actual object.

Specifically, a coordinate difference of landmarks of same actual objects in continuous images may be regarded as a parameter included in the action control instruction of the corresponding 3D model to form description of an action of the actual object. In this way, a control instruction is formed by utilizing abstract and narrowband coordinate data to control a 3D model to form a corresponding action, and then a rendered broadband VR video is formed, so that a VR live streaming is no longer limited by transmission bandwidth and is directly formed in real-time at the content consumption end.

Figure 3:
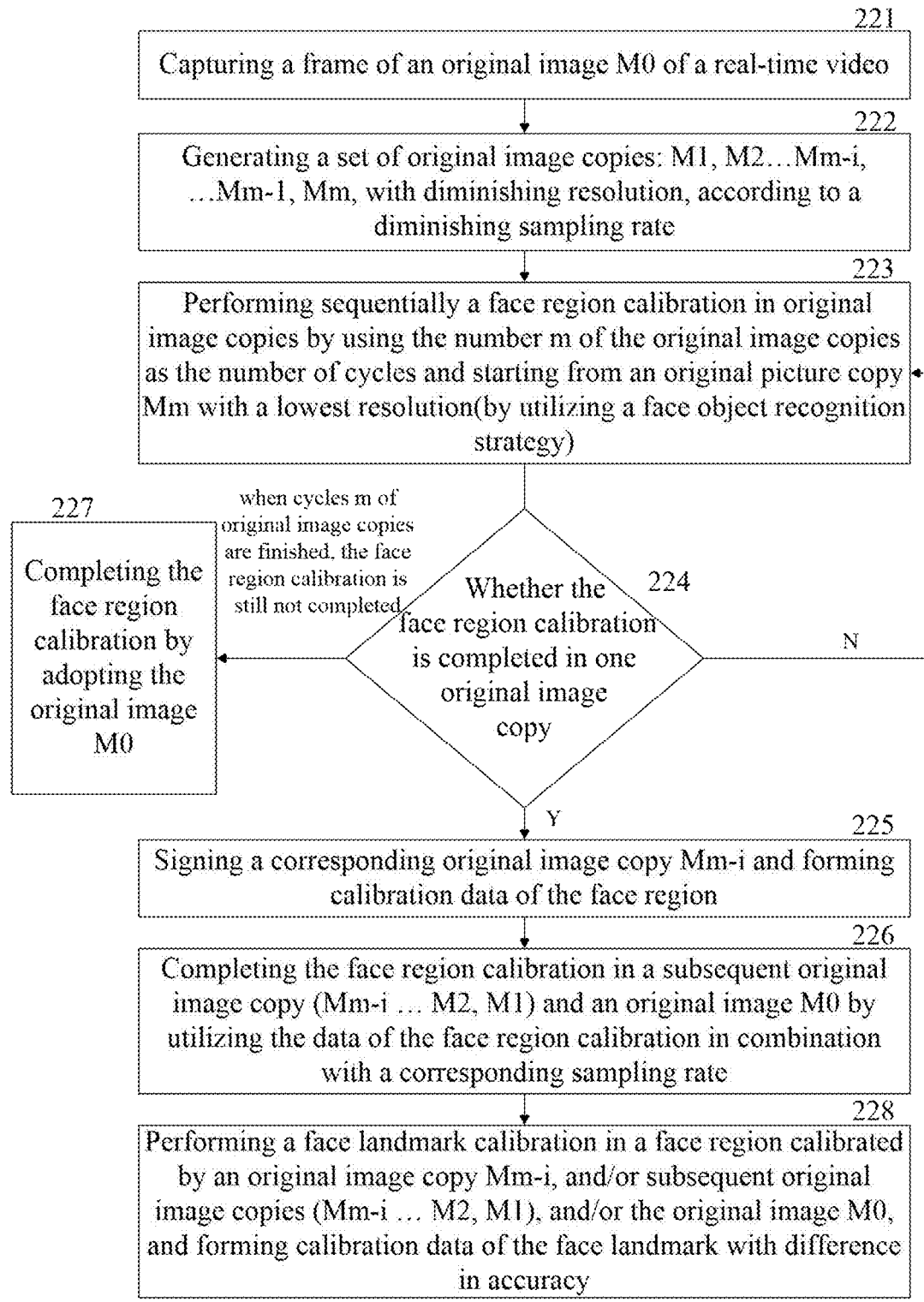
FIG. 3 is a flowchart of facial expression recognition of a method for real-time control of a three-dimensional model according to an embodiment of the present application.

FIG. 3 is a flowchart of facial expression recognition of a method for real-time control of a three-dimensional model according to an embodiment of the present application. When an actual object in an image is a face, a method of recognizing the face and a landmark of the face in a frame of image shown in FIG. 3 includes:

Step 221: capturing a frame of an original image M0 of a real-time video.

Step 222: generating a set of original image copies: M1, M2 . . . Mm−i, . . . Mm−1, Mm, with diminishing resolution, according to a diminishing sampling rate.

Step 223: performing sequentially a face region calibration in original image copies by using the number m of the original image copies as the number of cycles and starting from an original image copy Mm with a lowest resolution (by utilizing a face object recognition strategy).

Step 224: judging whether the face region calibration is completed in one original image copy; if the face region calibration is not completed, step 223 is turned back to execute continuously the face region calibration of a next original image copy; if the face region calibration is completed, step 225 is executed; and when cycles of m original image copies are finished and the face region calibration is still not completed, step 227 is executed.

Step 225: signing a corresponding original image copy Mm−i and forming calibration data of the face region.

Step 226: completing the face region calibration in a subsequent original image copy (Mm−i . . . M2, M1) and an original image M0 by utilizing the data of the face region calibration in combination with a corresponding sampling rate.

Step 227: completing the face region calibration by adopting the original image M0.

The face area calibration is completed by the above steps.

Further optimized processing for the steps that complete the face area calibration above may generate a set of original image copies with correspondingly decreased resolution according to a decreased sampling rate, and obtain an original image copy with the (most) low resolution that completes the face region calibration therefrom, and form calibration data of the face area.

The step of a face landmark calibration includes:

Step 228: performing a face landmark calibration in a face region calibrated by an original image copy Mm−i, and/or subsequent original image copies (Mm−i . . . M2, M1), and/or the original image M0, and forming calibration data of the face landmark with difference in accuracy. In the embodiment of the present application, the face landmark calibration may be performed by utilizing a face landmark recognition strategy.

In The method for real-time control of a three-dimensional model according to embodiments of the embodiment, as a normal mode, a set of original image copies with gradually decreased resolution are obtained by sampling and attenuating an original image, so that a face landmark recognition strategy which consumes most processing resources and causes delay of processing is completed as quickly as possible in an image copy with a lower accuracy, and the processing resources are saved. Then calibration data of the face region obtained is combined with a sampling rate of various original image copies, and the face region calibration on an original image copy and an original image with a relatively high resolution is quickly completed, and a face region calibration with a high accuracy and calibration data corresponding to the face region are obtained, meanwhile, a landmark calibration that does not consume the processing resources is calibrated on the original image copy and the original image of each of face region calibrations. Thus, the face region calibration and the face landmark calibration for different accuracy requirements may be obtained by utilizing The method for real-time control of a three-dimensional model according to the embodiments of the present application.

The calibration data of the face region of the original image copy is coordinate data, and a corresponding sampling rate is regarded as a scaling ratio of the original image, calibration data of the face region of one original image copy may be quickly and accurately mapped to a corresponding position of different original image copies or original images, and the face region calibration is completed.

It should be understood by those skilled in the art that as a quick mode, after the face region calibration of the original image copy Mm−i is completed in step 224, the face landmark calibration is performed directly for the face region calibrated by the original image copy Mm−i in step 228, and the calibration data of the face landmark is formed, and an optimal processing rate for the face area calibration and the face landmark calibration of a frame of image may be obtained.

The calibration data of the face region and the calibration data of the face landmark of the original image M0 are conductive to improve stability of the face landmark calibration and apply to a high-accuracy mode. On the other hand, since there is a slight difference between each frame and each frame captured by a webcam of a mobile device such as iPhone, an image sampled by a method of calculating an average value is more stable, the difference between each frame and each frame is relatively small, and the calibration data of the face region and the calibration data of the face landmark of the original image copy Mm−i are conductive to improve stability of an algorithm and apply to a stability mode.

In The method for real-time control of a three-dimensional model according to the embodiments, a data processing speed of the face region calibration and the face landmark calibration are very high, and a real-time requirement of 25 frames (25 fps) per second may be satisfied, and real-time recognition of an action or an expression may be achieved on a mobile device. By analyzing application scenarios such as an anchor live streaming scenario, a video call scenario, or a fast exercise scenario, a processing method of a high real-time face (facial) detection and alignment is realized by utilizing features such as an area, a region, and a displacement of an actual object in a video image, and a balance between a processing speed and a processing accuracy may be performed. On the premise of ensuring certain accuracy, the processing speed of continuous face region recognition is significantly improved in the real-time control method of the three-dimensional model according to the embodiments.

Figure 4:
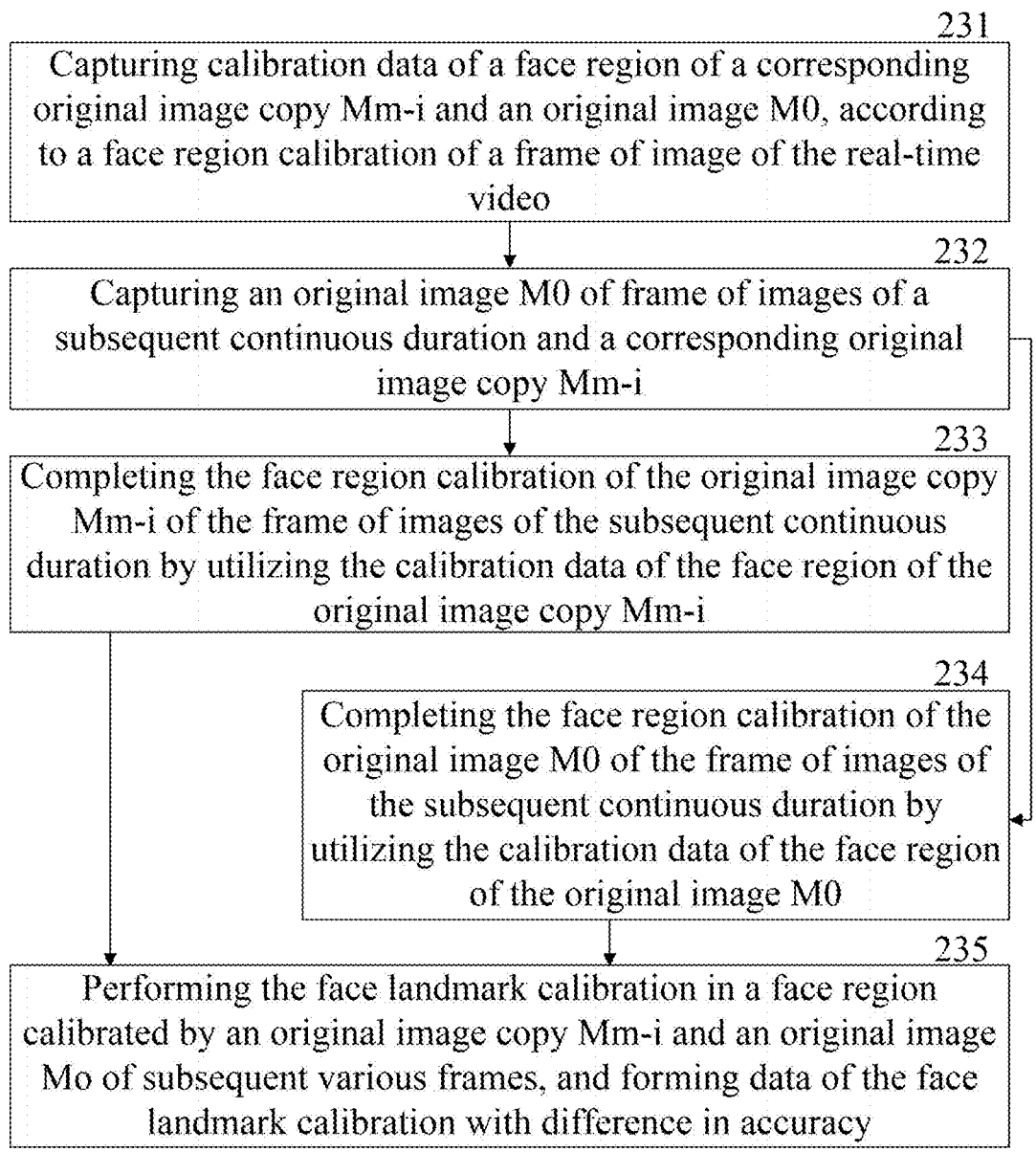
FIG. 4 is a flowchart of facial expression recognition of a method for real-time control of a three-dimensional model according to another embodiment of the present application.

FIG. 4 is a flowchart of facial expression recognition of a method for real-time control of a three-dimensional model according to another embodiment of the present application.

A flowchart of a method of identifying a face landmark in continuous frame of images based on a method of identifying a face and a landmark of the face in a frame of an image is illustrated. As shown in FIG. 4, the method includes:

Step 231: capturing calibration data of a face region of a corresponding original image copy Mm-i and an original image M0, according to a face region calibration of a frame of image of the real-time video; This step may take execution processes of steps 221 to 226.

Step 232: capturing an original image M0 of frame of images of a subsequent continuous duration and a corresponding original image copy Mm-i; then step 233 and step 234 are executed, respectively.

Step 233: completing the face region calibration of the original image copy Mm-i of the frame of images of the subsequent continuous duration by utilizing the calibration data of the face region of the original image copy Mm-i.

Step 234: completing the face region calibration of the original image M0 of the frame of images of the subsequent continuous duration by utilizing the calibration data of the face region of the original image M0.

It should be appreciated by those skilled in the art that there is no difference in the order of execution between step 233 and step 234, step 234 may be performed before step 233, or both may be performed simultaneously.

Step 235: performing the face landmark calibration in a face region calibrated by an original image copy Mm-i and an original image Mo of subsequent various frames, and forming data of the face landmark calibration with difference in accuracy.

In the real-time control method of the three-dimensional model according to the embodiment, as for a characteristic that an actual object in a real-time video does not generate a large displacement in a specific scenario, data of a face region calibration in a previous frame is applied to a face region calibration of a subsequent limited number of images, and a calibration recognition speed of a face region is further improved in the case of ensuring stability of the face region calibration, and consumption of processing resources during a process of the face region calibration is further reduced.

Figure 5:
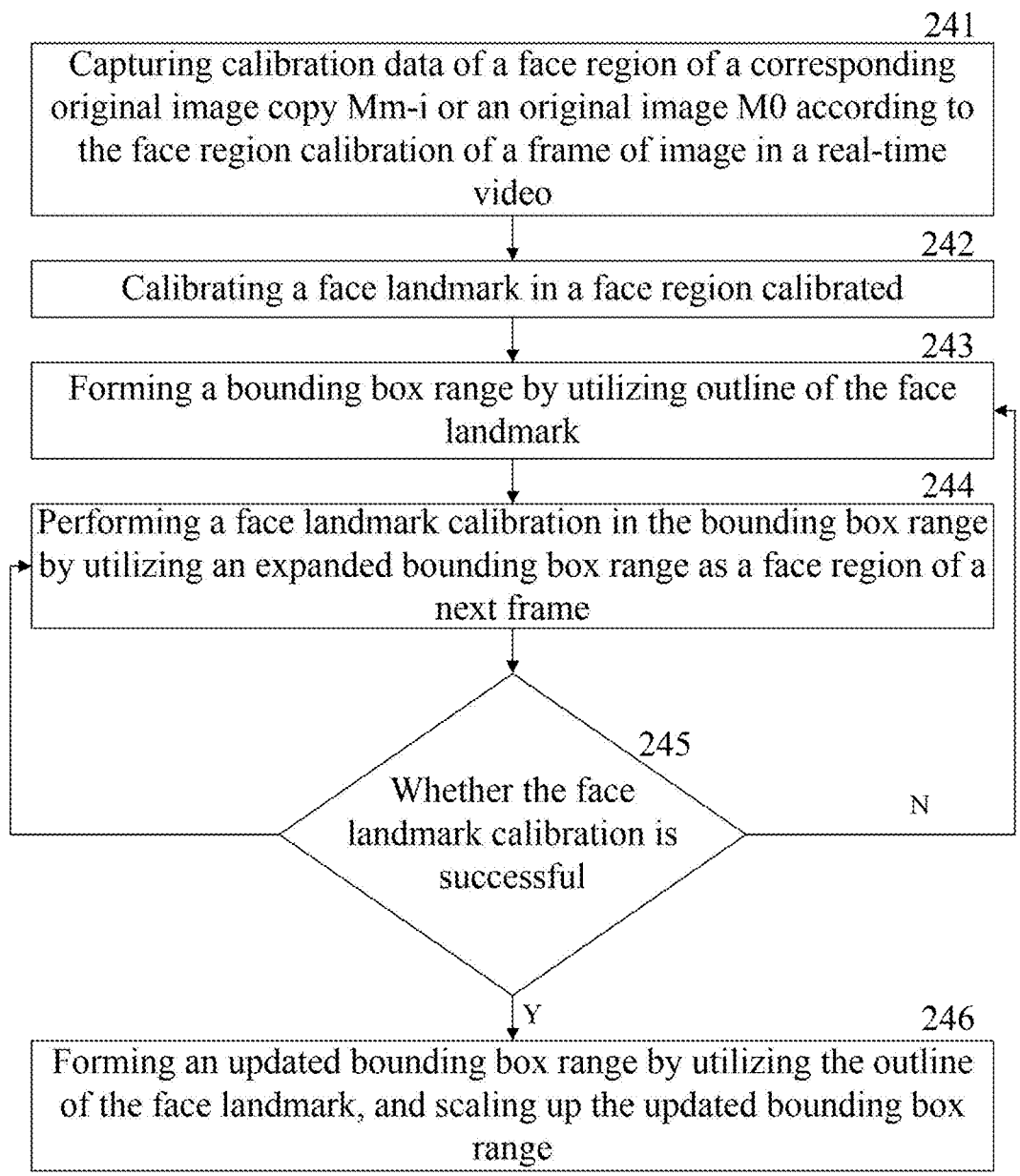
FIG. 5 is a flowchart of facial expression recognition of a method for real-time control of a three-dimensional model according to another embodiment of the present application.

FIG. 5 is a flowchart of facial expression recognition of a method for real-time control of a three-dimensional model according to another embodiment of the present application. A flowchart of a method of identifying a face and a landmark of the face in continuous frame of images based on a method of identifying the landmark of the face in a frame of image is illustrated. As shown in FIG. 5, the method includes:

Step 241: capturing calibration data of a face region of a corresponding original image copy Mm-i or an original image M0 according to the face region calibration of a frame of image in a real-time video; This step may take execution processes of steps 221 to 226.

Step 242: calibrating a face landmark in a face region calibrated.

Step 243: forming a bounding box range by utilizing outline of the face landmark.

Step 244: performing a face landmark calibration in the bounding box range by utilizing an expanded bounding box range as a face region of a next frame.

Step 245: judging whether the face landmark calibration is successful; executing step 246 if successful, and turning to step 241 if unsuccessful.

Step 246: forming an updated bounding box range by utilizing the outline of the face landmark, and scaling up the updated bounding box range.

In the real-time control method of the three-dimensional model according to the embodiment, outline (a bounding box) of a face landmark determined in a previous frame is regarded as data of a face region calibration in a next frame of image, that is, a result of the previous frame is regarded as an initial value of the next frame to predict the next frame. When a face does not violent exercise, this algorithm runs at a high speed and consumes minimal processing resources. When the face is doing violent exercise, such as an anchor is dancing and swinging quickly the head, the algorithm runs at substantially the same speed as a general algorithm.

A face region calibration range is expanded by utilizing a proper expansion of a bounding box, so that time-consuming face region detection for each frame is avoided when exercise of the face is not violent, and real-time performance of overall operation of the algorithm is improved. If the face landmark calibration in the present embodiment may not obtain a correct result, it indicates that the face may produce violent exercise between two frames, and then face detection is performed again to obtain location of a new face, and then the landmark calibration is performed again.

A capture of a face expression in an image of a video includes a face region recognition calibration process, a face landmark (such as five sense organs) location calibration and an image universal processing procedure in the video including two dimensional or three dimensional angle transforms and distortions based on coordinates, for example, image reproduction, a secondary sample-forming image, an image scale, establishment of a coordinate map between similar images, alignment and translation of same or similar portions between different images, which is not described in detail in the embodiment.

Figure 6:
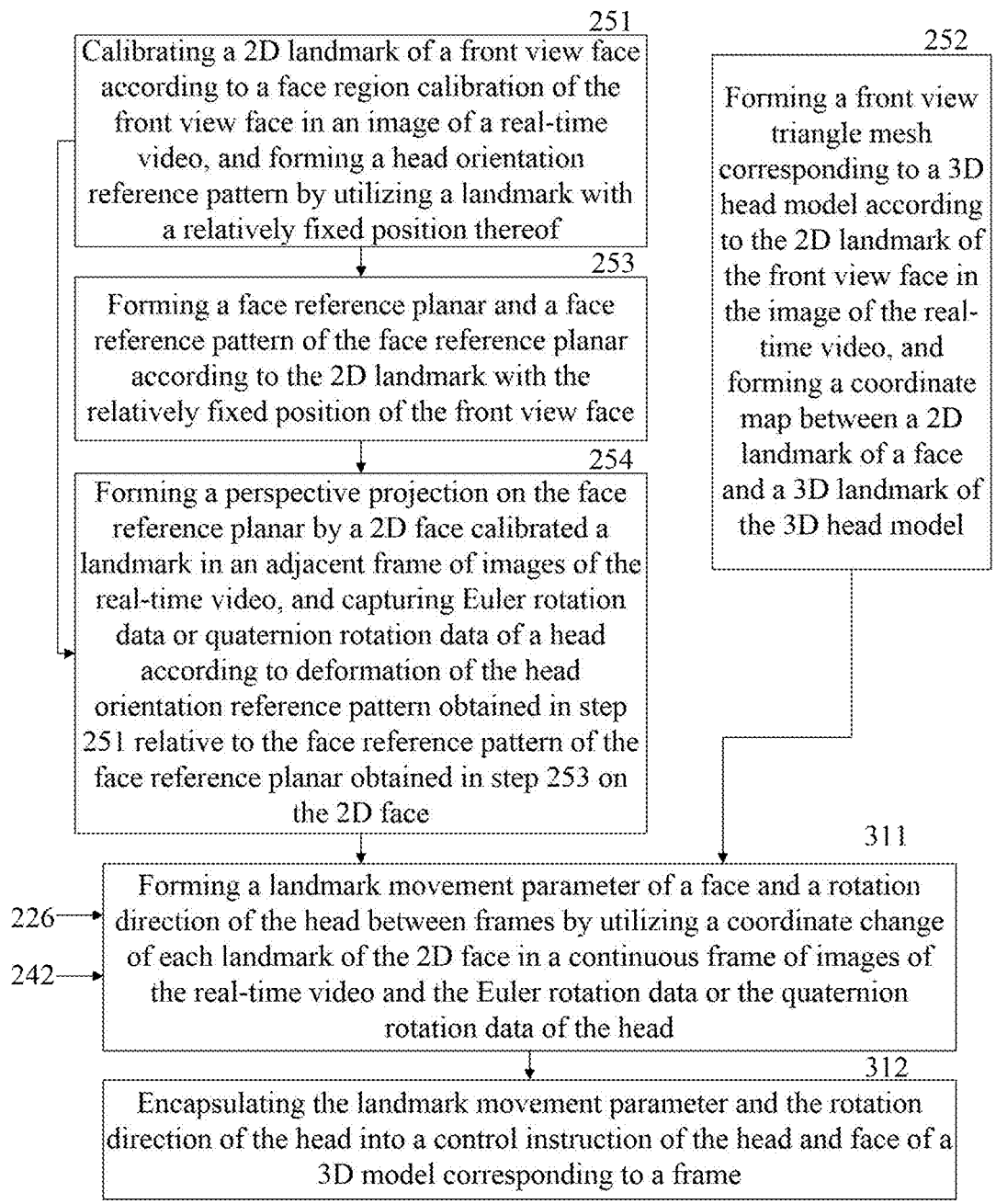
FIG. 6 is a flowchart of head action recognition and facial expression recognition of a method for real-time control of a three-dimensional model according to an embodiment of the present application.

FIG. 6 is a flowchart of head action recognition and facial expression recognition of a method for real-time control of a three-dimensional model according to an embodiment of the present application. A flowchart of a method of recognizing an action of a head in continuous frame of images when an actual object in the image is the head on the basis of a method of recognizing a face landmark in a frame of image is illustrated based on integrity of the head and a face. As shown in FIG. 6, the method includes the following steps.

Step 251: calibrating a 2D landmark of a front view face according to a face region calibration of the front view face in an image of a real-time video, and forming a head orientation reference pattern by utilizing a landmark with a relatively fixed position thereof; and skipping to step 254.

Step 253: forming a face reference planar and a face reference pattern of the face reference planar according to the 2D landmark with the relatively fixed position of the front view face; and executing step 254.

Step 254: forming a perspective projection on the face reference planar by a 2D face calibrated a landmark in an adjacent frame of images of the real-time video, and capturing Euler rotation data or quaternion rotation data of a head according to deformation of the head orientation reference pattern obtained in step 251 relative to the face reference pattern of the face reference planar obtained in step 253 on the 2D face.

The Euler rotation data described above includes a rotation angle of the head relative to three axial directions x, y, and z.

The Euler rotation data may be transformed to the quaternion rotation data to obtain a relatively high processing efficiency of a rotation state and a live difference value during a rotating process.

In The method for real-time control of a three-dimensional model according to the embodiment, a head orientation reference pattern (for example, a polygon pattern with a pair of eyes and a nose tip as a vertex) is formed by utilizing a landmark (for example, the pair of eyes and the nose tip) that maintains a fixed interval in a front view 2D (planar) face landmark in an image, meanwhile, a face reference planar and a face reference pattern are formed, and a map relationship between a 2D (planar) face landmark coordinate and a 3D face landmark coordinate is established by utilizing projection repeatability of a front view 2D (planar) face landmark and a front view 3D (stereoscopic) face landmark. It is achieved that the 2D face landmark coordinate is increased dimension into the 3D face landmark coordinate and a map relationship is formed, so that a position change of the 2D face landmark may be accurately reflected in a 3D face model (including an integrated head model).

By comparing a deformation angle and a deformation length of a line in a head orientation reference pattern relative to the face reference pattern of the face reference planar when the head is rotated, the rotation angle of the head relative to the three axial directions x, y, z is obtained for Euler rotation or quaternion rotation.

This means a coordinate change of the face landmark, that is, embodies the coordinate change of the landmark when a facial expression changes, and also embodies a coordinate change of head rotation in different coordinate system spaces. Through the real-time control method of the three-dimensional model according to the embodiment, this coordinate change may become a control basis of the three-dimensional model.

As shown in FIG. 6, when the actual object is the head, the forming an action control instruction of a corresponding 3D model of the head and face includes:

Step 226: completing the face region calibration in a subsequent original image copy (Mm−i . . . M2, M1) and an original image M0 by utilizing the data of the face region calibration in combination with a corresponding sampling rate.

Step 242: calibrating a face landmark in a face region calibrated.

Step 252: forming a front view triangle mesh corresponding to a 3D head model according to the 2D landmark of the front view face in the image of the real-time video, and forming a coordinate map between a 2D landmark of a face and a 3D landmark of the 3D head model.

Step 311: forming a landmark movement parameter of a face and a rotation direction of the head between frames by utilizing a coordinate change of each landmark of the 2D face in a continuous frame of images of the real-time video and the Euler rotation data or the quaternion rotation data of the head obtained in step 254 according to the face landmark, a rotation angle and the coordinate map obtained.

Step 312: encapsulating the landmark movement parameter and the rotation direction of the head into a control instruction of the head and face of a 3D model corresponding to a frame.

In the embodiment of the present application, as for a deformation effect of the head rotation to the facial expression, first the 2D landmark is increased dimension into the 3D landmark, and then the 3D landmark is decreased dimension into 2D, and thereby a control method of a 2D control point is generated, so that recognition and expression for a fine expression may be effectively solved under the condition that there is a rotation angle in the head. When the actual object envisages a webcam and the head is not rotated, it may be considered that the rotation angle is 0 degree, and then the same method is adopted to process.

As for a three-dimensional (3D) modeling process, a modeling process including establishment of a three-dimensional model, establishment of a three-dimensional scenario, transmission, storage and download of the three-dimensional model, according to universal modeling rules, by utilizing a modeling tool, and deployment of the three-dimensional model in the three-dimensional scenario embodied in the prior art are not described in detail. A three-dimensional model of a cartoon image typically includes a 3D model of a trunk and a head, the 3D model of the head further includes a 3D model of a face, and these 3D models may be separately stored, transmitted or controlled. As for a fine 3D mesh that represents concave and convex textures and is formed on a surface of the three-dimensional model in the three-dimensional scenario, a process that a local shape of the three-dimensional model is changed by adjusting a spatial coordinate of a vertex of a corresponding 3D mesh is not described in detail.

Figure 7:
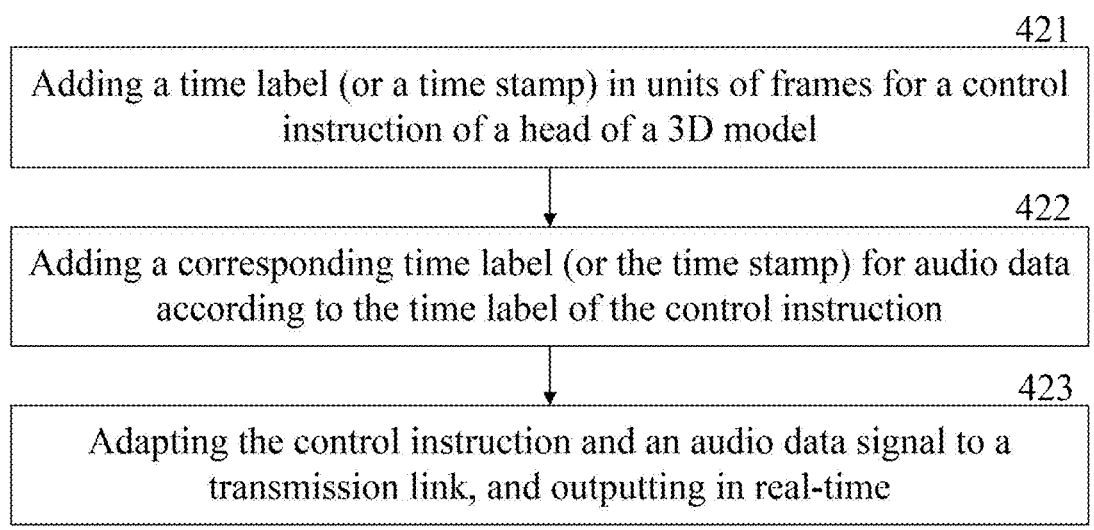
FIG. 7 is a flowchart of a control instruction and video data synchronization of a method for real-time control of a three-dimensional model according to an embodiment of the present application.

FIG. 7 is a flowchart of a control instruction and audio data synchronization of a method for real-time control of a three-dimensional model according to an embodiment of the present application. As shown in FIG. 7, step 400 shown in FIG. 1a may include:

Step 421: adding a time label (or a time stamp) in units of frames for a control instruction of a head of a 3D model.

Step 422: adding a corresponding time label (or the time stamp) for audio data according to the time label of the control instruction.

Step 423: adapting the control instruction and an audio data signal to a transmission link, and outputting in real-time.

In the embodiment of the present application, a control instruction and audio data may not be accurately synchronously received at a content consumption end due to an influence of a mobile internet transmission mechanism, in this case, an appropriate buffer region may be utilized to reduce requirements for signal synchronization reception, so that synchronization output of the control instruction and the audio data may be restored by the same time label so as to ensure synchronization quality of audio video broadcasted by VR.

Figure 8:
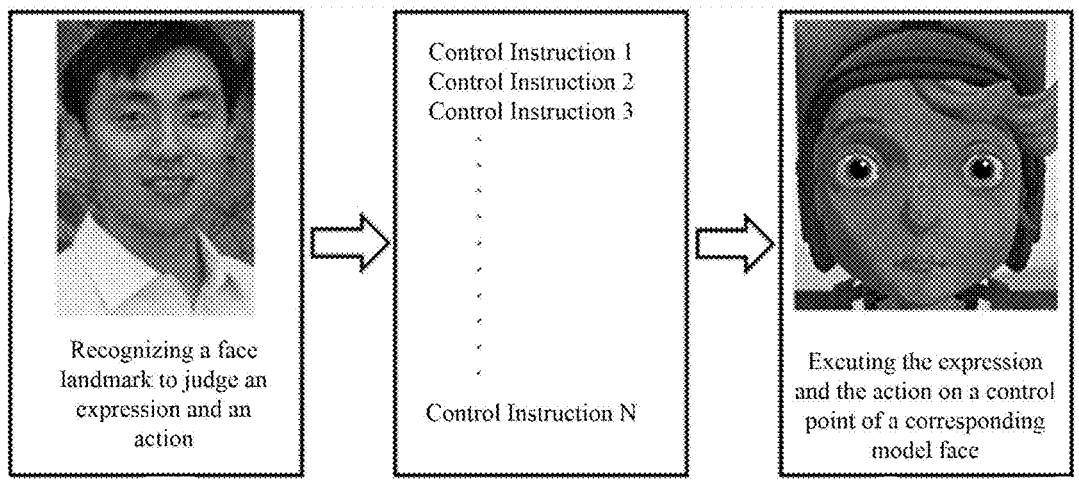
FIG. 8 is a schematic diagram of a control effect of a method for real-time control of a three-dimensional model according to an embodiment of the present application.

FIG. 8 is a schematic diagram of a control effect of a method for real-time control of a three-dimensional model according to an embodiment of the present application. As shown in FIG. 8, an actual object is, for example, a character's face, by recognizing a face region and a position change of a landmark within the face region in continuous images of a video, and a change parameter of a facial action expression based on a change amount is formed, and thereby a continuous action control instruction of a facial expression is formed, and an action control is performed to a corresponding landmark on a face 3D model corresponding to a cartoon 3D model, and a real-time facial expression of the 3D model of a cartoon face is formed.

Summarily, in an embodiment of the present application, basic steps of face region mark in a method for real-time control of a three-dimensional model mainly include:

locating a face region by a low-resolution copy of frame of images in a video so as to improve a speed of the face region mark;

applying directly the face region on a corresponding copy of an adjacent frame of images so as to further improve a marked speed of the face region; and marking a face landmark in the face region of frame of images or the corresponding copy so as to apply different application modes.

Summarily, in an embodiment of the present application, basic steps of a head rotation mark in a method for real-time control of a three-dimensional model mainly include:

establishing a head orientation reference pattern, a face reference planar and a face reference pattern of the face reference planar by utilizing a position fixed landmark of a front view 2D face in an image of a frame or the corresponding copy so as to form a coordinate map relationship between a landmark of a face of a front view 3D head model and a 2D face landmark;

capturing a rotation angle of a head by measuring deformation of the head orientation reference pattern relative to the face reference pattern when the head in the adjacent frame of images is rotating; and forming a control instruction of an action expression of the head and the face in combination with a position change of a 2D face landmark of the adjacent frame and the rotation data of the head.

Figure 9:
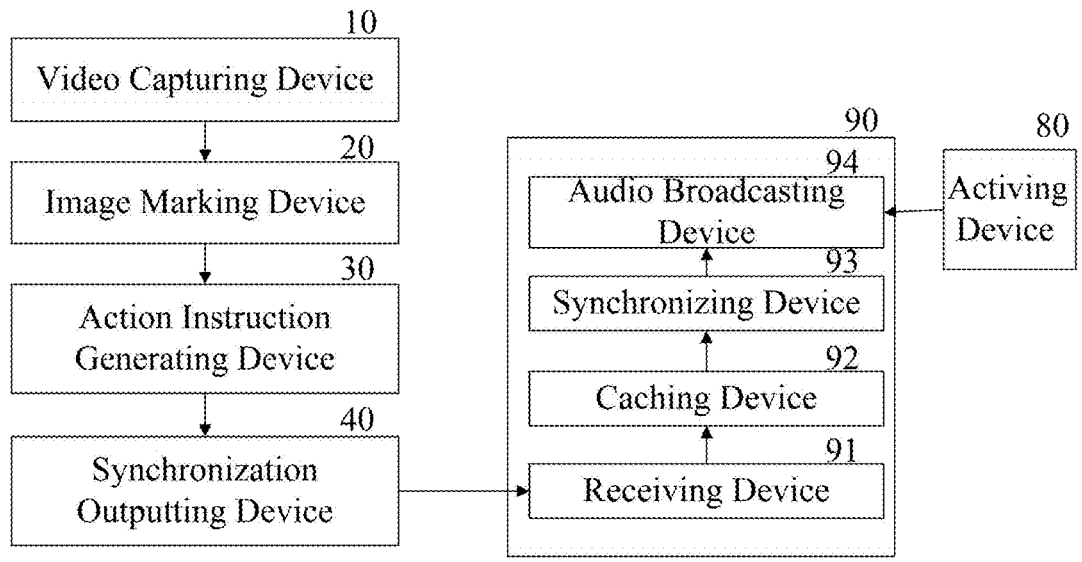
FIG. 9 is a schematic structural diagram of a real-time control system of a three-dimensional model according to an embodiment of the present application.

FIG. 9 is a schematic structural diagram of a real-time control system of a three-dimensional model according to an embodiment of the present application. As shown in FIG. 9, the real-time control system includes a video capturing device 10, an image marking device 20 and an action instruction generating device 30.

The video capturing device 10 is configured to obtain a real-time video of an actual object;

the image marking device 20 is configured to mark an action of the actual object in an image of the real-time video; and the action instruction generating device 30 is configured to form an action control instruction of a corresponding 3D model according to a change of the action that is marked.

In an embodiment of the present application, the real-time control system of the three-dimensional model further includes a synchronization outputting device 40, configured to synchronize audio data and the action control instruction and output.

In an embodiment of the present application, the real-time control system of the three-dimensional model further includes an activing device 80 and a broadcasting device 90.

The activing device 80 is configured to invoke the corresponding 3D model obtained; and the broadcasting device 90 is configured to control the corresponding 3D model to complete an action according to a received action control instruction.

In an embodiment of the present application, the broadcasting device 90 of the real-time control system of the three-dimensional model further includes a receiving device 91, a caching device 92, a synchronizing device 93 and an audio broadcasting device 94.

The receiving device 91 is configured to receive the audio data and the action control instruction;

the caching device 92 is configured to cache the audio data and the action control instruction;

the synchronizing device 93 is configured to make the audio data and the action control instruction cooperate; and the audio broadcasting device 94 is configured to control the corresponding 3D model to complete an action and broadcasting synchronously an audio.

Figure 10:
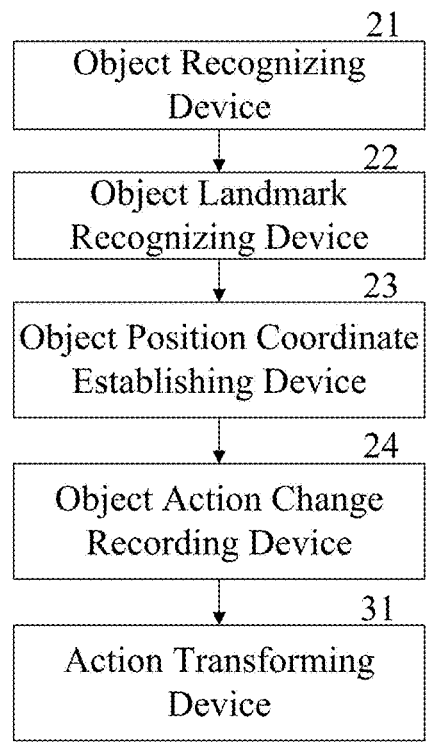
FIG. 10 is a schematic structural diagram of image recognition of a real-time control system of a three-dimensional model according to an embodiment of the present application.

FIG. 10 is a schematic structural diagram of image recognition of a real-time control system of a three-dimensional model according to an embodiment of the present application. As shown in FIG. 10, an image marking device 20 includes an object recognizing device 21, an object landmark recognizing device 22, an object position coordinate establishing device 23 and an object action change recording device 24.

The object recognizing device 21 is configured to recognize an actual object in an image of a real-time video according to a preset object recognition strategy;

the object landmark recognizing device 22 is configured to recognize a landmark of the actual object in the image according to a preset landmark recognition strategy;

the object position coordinate establishing device 23 is configured to form a planar coordinate space of the landmark and a stereoscopic coordinate space of the corresponding 3D model; and the object action change recording device 24 is configured to measure a coordinate change of the landmark in the planar coordinate space in continuous images and record a corresponding coordinate change of the landmark in the stereoscopic coordinate space in the continuous images.

As shown in FIG. 10, an action instruction generating device includes an action transforming device 31 configured to form the coordinate change of the landmark into an action control instruction of a 3D model corresponding to the actual object.

Figure 11:
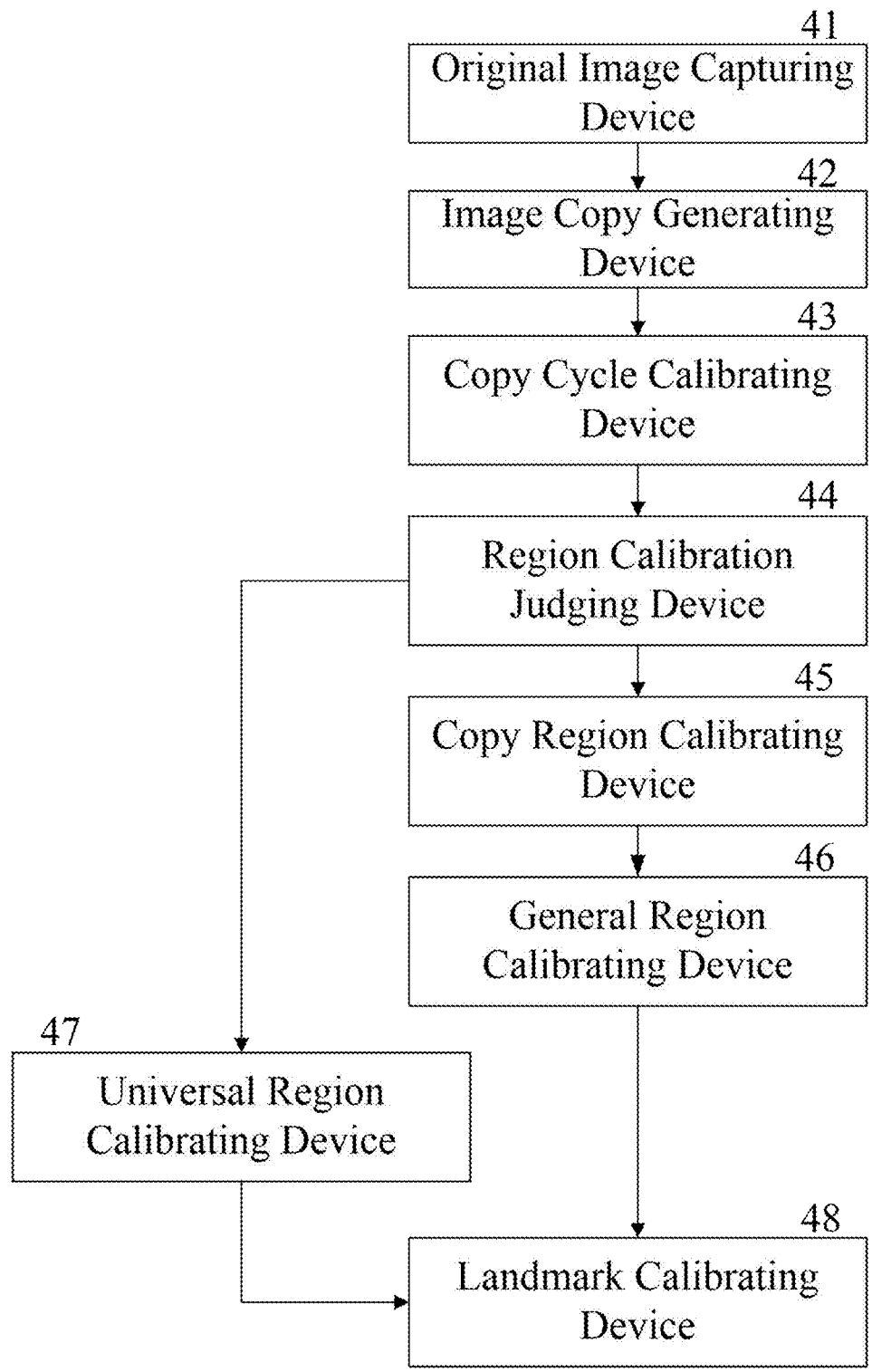
FIG. 11 is a schematic structural diagram of single frame object and landmark recognition of a real-time control system of a three-dimensional model according to an embodiment of the present application.

FIG. 11 is a schematic structural diagram of single frame object and landmark recognition of a real-time control system of a three-dimensional model according to an embodiment of the present application. As shown in FIG. 11, an object recognizing device 21 includes an original image capturing device 41, an image copy generating device 42, a copy cycle calibrating device 43, a region calibration judging device 44, a copy region calibrating device 45, a general region calibrating device 46, a universal region calibrating device 47 and a landmark calibrating device 48.

The original image capturing device 41 is configured to obtain a frame of an original image M0 of the real-time video;

the image copy generating device 42 is configured to generate a set of original image copies: M1, M2 . . . Mm–i, . . . Mm–1, Mm, with diminishing resolution, according to a diminishing sampling rate;

the copy cycle calibrating device 43 is configured to perform sequentially a face region calibration in original image copies by using the number m of the original image copies as the number of cycles and starting from an original image copy Mm with a lowest resolution, and form calibration data of the face region;

the region calibration judging device 44 is configured to judge whether the face region calibration is completed in one original image copy, the copy cycle calibrating device 43 is invoked to continue a next cycle calibration if the face region calibration is not completed, and the copy region calibrating device 45 is invoked if the face region calibration is completed, and the universal region calibrating device 47 is invoked when a cycle is terminated and the face region calibration is not completed;

the copy region calibrating device 45 is configured to sign a corresponding original image copy Mm–i and form the data of the face region calibration;

the general region calibrating device 46 is configured to complete the face region calibration in subsequent original image copies (Mm–i . . . M2, M1) and an original image M0 by utilizing the data of the face region calibration in combination with a corresponding sampling rate;

the universal region calibrating device 47 is configured to complete the face region calibration by adopting the original image M0 when the cycle is terminated and the face region calibration is not completed;

the landmark calibrating device 48 is configured to perform a face landmark calibration (by utilizing a face landmark recognition strategy) in a face region calibrated by an original image copy Mm−i, and/or subsequent original image copies (Mm−i . . . M2, M1), and/or the original image M0, and form calibration data of the face landmark with difference in accuracy.

Figure 12:
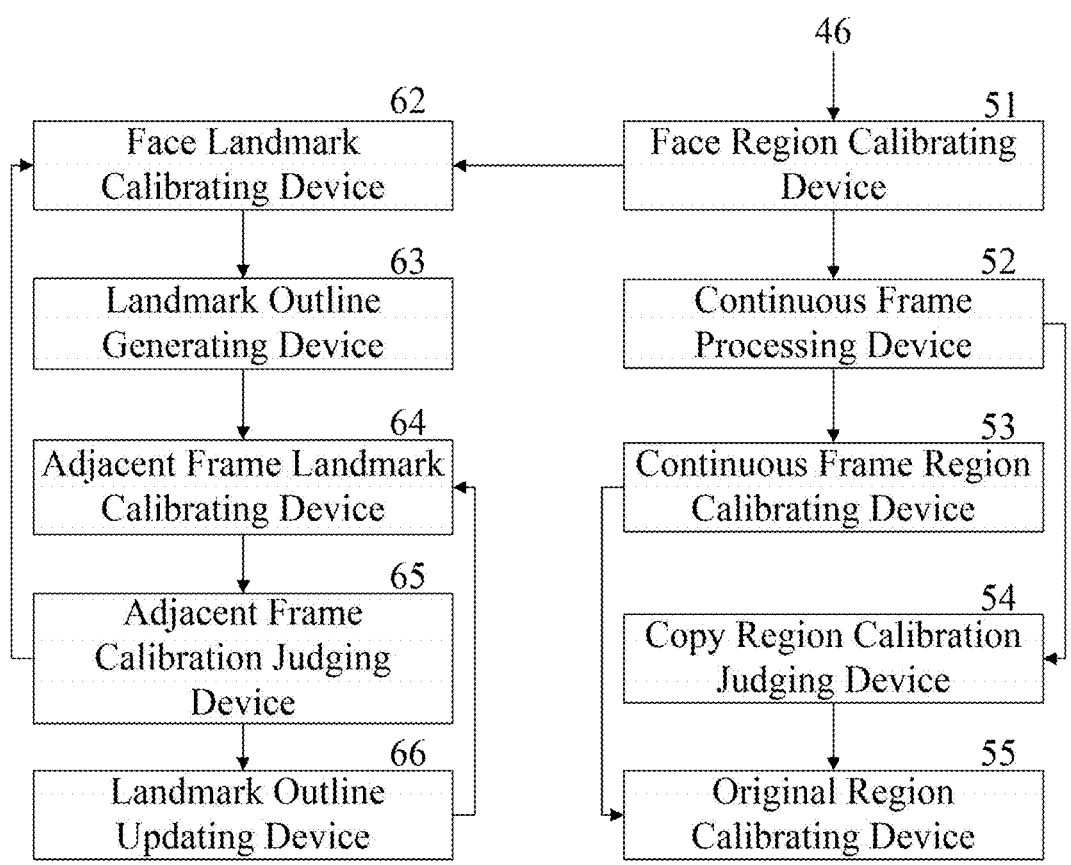
FIG. 12 is a schematic structural diagram of object recognition in continuous frames of a real-time control system of a three-dimensional model according to an embodiment of the present application.

FIG. 12 is a schematic structural diagram of object recognition in continuous frames of a real-time control system of a three-dimensional model according to an embodiment of the present application. As shown in FIG. 12, an object recognizing device 21 includes a face region calibrating device 51, a continuous frame processing device 52, a continuous frame region calibrating device 53, a copy region calibration judging device 54 and an original region calibrating device 55.

The face region calibrating device 51 is configured to obtain (through an ordinary region calibrating device 46) calibration data of a face region of a corresponding original image copy Mm−i and an original image M0;

the continuous frame processing device 52 is configured to obtain an original image M0 of frame of images of a subsequent continuous duration and a corresponding original image copy Mm−i;

the continuous frame region calibrating device 53 is configured to complete a face region calibration of the original image M0 of frame of images of the subsequent continuous duration by utilizing the calibration data of the face region of the original image M0;

the copy region calibration judging device 54 is configured to complete a face region calibration of the original image copy Mm−i of frame of images of the subsequent continuous duration by utilizing the calibration data of the face region of the original image copy Mm−i; and the original region calibrating device 55 is configured to perform a face landmark calibration in a face region calibrated by the original image copy Mm−i of subsequent various frames and/or the original image M0, and form calibration data of the face landmark with difference in accuracy.

As shown in FIG. 12, the object recognizing device 21 further includes a face landmark calibrating device 62, a landmark outline generating device 63, an adjacent frame landmark calibrating device 64, an adjacent frame calibration judging device 65 and a landmark outline updating device 66.

The face landmark calibrating device 62 is configured to calibrate a face landmark in a face region calibrated by a corresponding original image copy Mm−i or an original image M0 obtained;

the landmark outline generating device 63 is configured to form a bounding box range by utilizing an outline of the face landmark;

the adjacent frame landmark calibrating device 64 is configured to perform a face landmark calibration in the bounding box range by utilizing an expanded bounding box range as a face region of a next frame;

the adjacent frame calibration judging device 65 is configured to judge whether the face landmark calibration is successful, invoke the landmark outline updating device 66 if successful, and invoke the face landmark calibrating device 62 if unsuccessful; and the landmark outline updating device 66 is configured to invoke the adjacent frame landmark calibrating device 64 after forming an updated bounding box range by utilizing the outline of the face landmark and scaling up the updated bounding box range.

Figure 13:
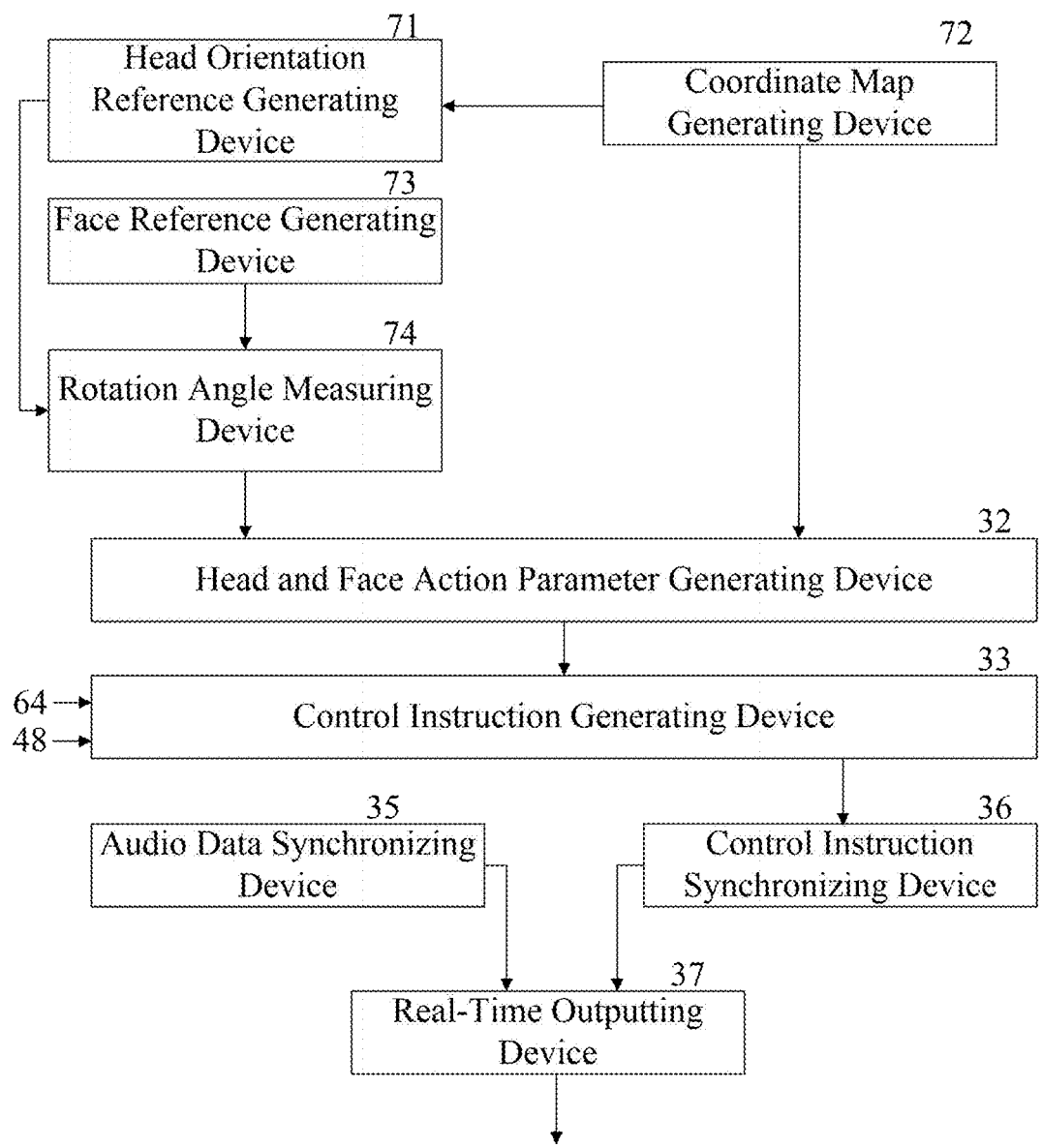
FIG. 13 is a schematic structural diagram of action recognition of a head and a face of a real-time control system of a three-dimensional model according to an embodiment of the present application.

FIG. 13 is a schematic structural diagram of action recognition of a head and a face of a real-time control system of a three-dimensional model according to an embodiment of the present application. As shown in FIG. 13, an object position coordinate establishing device 23 includes a head orientation reference generating device 71, a coordinate map generating device 72, a face reference generating device 73 and a rotation angle measuring device 74.

The head orientation reference generating device 71 is configured to calibrate a 2D landmark of a front view face according to a face region calibration of the front view face in an image of a real-time video, and form a head orientation reference pattern by utilizing a landmark with a relatively fixed position thereof;

the coordinate map generating device 72 is configured to form a front view triangle mesh corresponding to a 3D head model according to the 2D landmark of the front view face in the image of the real-time video, and form a coordinate map between a 2D landmark of a face and a 3D landmark of the 3D head model;

the face reference generating device 73 is configured to form a face reference planar and a face reference pattern of the face reference planar according to the 2D landmark with the relatively fixed position of the front view face; and the rotation angle measuring device 74 is configured to form a perspective projection on the face reference planar by a 2D face calibrated a landmark in an adjacent frame of images of the real-time video, and obtain Euler rotation data or quaternion rotation data of a head according to deformation of the head orientation reference pattern relative to the face reference pattern of the face reference planar on the 2D face.

As shown in FIG. 13, in the system for real-time control of the three-dimensional model according to an embodiment of the present application, a structure formed a control instruction for a head and face object action of continuous frames of a video includes a head and face action parameter generating device 32 and a control instruction generating device 33.

The head and face action parameter generating device 32 is configured to form a landmark movement parameter of a face and a rotation direction of a head between frames by utilizing a coordinate change of each landmark of the 2D face in continuous frame of images of the real-time video and Euler rotation data or quaternion rotation data of the head;

and the control instruction generating device 33 is configured to encapsulate the landmark movement parameter and the rotation direction of the head into a control instruction of the head and face of a 3D model corresponding to a frame.

As shown in FIG. 13, in the system for real-time control of the three-dimensional model according to an embodiment of the present application, a structure of synchronization of an object action control instruction of the head and face of the continuous frames of the video and audio data (a synchronization outputting device 40) includes an audio data synchronizing device 35, a control instruction synchronizing device 36 and a real-time outputting device 37.

The audio data synchronizing device 35 is configured to add a corresponding time label for the audio data according to a time label of a control instruction;

the control instruction synchronizing device 36 is configured to add a time label in units of frames for the control instruction of a head of a 3D model; and the real-time outputting device 37 is configured to adapt the control instruction and an audio data signal to a transmission link, and output in real-time.

The above are only preferred embodiments of the present application, which are not intended to limit the present application. Any modifications, equivalent substitutions and the like made within the spirit and principle of the present application should be included within the protective scope of the present application.

What is claimed is:

1. A method for real-time control of a three-dimensional model, comprising:
   capturing a real-time video of an actual object;
   marking an action of the actual object in an image of the real-time video;
   forming an action control instruction of a corresponding 3D model according to a change of the action that is marked; and
   synchronizing audio data and the action control instruction and outputting,
   wherein, the synchronizing audio data and the action control instruction and outputting comprises:
   adding a time label in units of frames for a control instruction of a head of a 3D model;
   adding a corresponding time label for the audio data according to the time label of the control instruction; and
   adapting the control instruction and an audio data signal to a transmission link, and outputting in real-time.

2. The method for real-time control of a three-dimensional model according to claim 1, wherein the marking an action of the actual object in an image of the real-time video comprises:
   recognizing the actual object in the image of the real-time video according to a preset object recognition strategy;
   recognizing a landmark of the actual object in the image of the real-time video according to a preset landmark recognition strategy;
   forming a planar coordinate space of the landmark and a stereoscopic coordinate space of the corresponding 3D model; and
   measuring a coordinate change of the landmark in the planar coordinate space in continuous images, and recording a corresponding coordinate change of the landmark in the stereoscopic coordinate space in the continuous images.

3. The method for real-time control of a three-dimensional model according to claim 2, wherein the forming an action control instruction of a corresponding 3D model according to a change of the action that is marked comprises:
   forming an action control instruction of a 3D model corresponding to the actual object by utilizing the coordinate change of the landmark.

4. The method for real-time control of a three-dimensional model according to claim 2, wherein the recognizing the actual object in the image of the real-time video according to a preset object recognition strategy comprises:
   capturing a frame of an original image M0 of the real-time video; and
   generating a set of original image copies with diminishing resolution according to a diminishing sampling rate, capturing an original image copy of a low-resolution that completes a face region calibration therefrom, and forming calibration data of the face region.

5. The method for real-time control of a three-dimensional model according to claim 4, wherein the recognizing the actual object in the image of the real-time video according to a preset object recognition strategy further comprises:
   completing the face region calibration by the original image M0 when the face region calibration is not completed in all original image copies.

6. The method for real-time control of a three-dimensional model according to claim 4, wherein the recognizing a landmark of the actual object in the image according to a preset landmark recognition strategy comprises:
   performing a face landmark calibration in a face region calibrated by an original image copy Mm−i, and/or subsequent original image copies (Mm−i . . . M2, M1), and/or the original image M0, and forming calibration data of the face landmark with difference in accuracy.

7. The method for real-time control of a three-dimensional model according to claim 2, wherein the recognizing the actual object in the image of the real-time video according to a preset object recognition strategy comprises:
   capturing calibration data of a face region of a corresponding original image copy Mm−i and an original image M0 according to a face region calibration of a frame of image of the real-time video;
   capturing an original image M0 of frame of images of a subsequent continuous duration and a corresponding original image copy Mm−i, and
   completing a face region calibration of the original image copy Mm−i of the frame of images of the subsequent continuous duration by utilizing the calibration data of the face region of the original image copy Mm−i; or
   completing a face region calibration of the original image M0 of the frame of images of the subsequent continuous duration by utilizing the calibration data of the face region of the original image M0.

8. The method for real-time control of a three-dimensional model according to claim 2, wherein the recognizing the actual object in the image of the real-time video according to a preset object recognition strategy comprises:
   capturing calibration data of a face region of a corresponding original image copy Mm−i or an original image M0 according to the face region calibration of a frame of an image in a real-time video;
   calibrating a face landmark in a face region calibrated;
   forming a bounding box range by utilizing an outline of the face landmark; and
   performing a face landmark calibration in the bounding box range by utilizing an expanded bounding box range as a face region of a next frame.

9. The method for real-time control of a three-dimensional model according to claim 8, wherein the recognizing the actual object in the image of the real-time video according to a preset object recognition strategy further comprises:
   forming an updated bounding box range and scaling up by utilizing the outline of the face landmark when it is judged that the face landmark calibration is successful; and
   capturing the corresponding original image copy Mm−i or the calibration data of the original image M0, when it is judged that the face landmark calibration is successful.

10. The method for real-time control of a three-dimensional model according to claim 2, wherein the forming a planar coordinate space of the landmark and a stereoscopic coordinate space of the corresponding 3D model comprises:
   calibrating a 2D landmark of a front view face according to a face region calibration of the front view face in the image of the real-time video, and forming a head orientation reference pattern by utilizing a landmark with a relatively fixed position thereof;
   forming a front view triangle mesh corresponding to a 3D head model according to the 2D landmark of the front view face in the image of the real-time video, and forming a coordinate map between the 2D landmark of a face and a 3D landmark of the 3D head model;

forming a face reference planar and a face reference pattern of the face reference planar according to the 2D landmark with the relatively fixed position of the front view face; and forming a perspective projection on the face reference planar by a 2D face calibrated a landmark in an adjacent frame of images of the real-time video, and capturing Euler rotation data or quaternion rotation data of a head according to deformation of the head orientation reference pattern relative to the face reference pattern of the face reference planar on the 2D face.

11. The method for real-time control of a three-dimensional model according to claim 10, wherein the measuring a coordinate change of the landmark in the planar coordinate space in continuous images, and recording a corresponding coordinate change of the landmark in the stereoscopic coordinate space in the continuous images comprises:

forming a landmark movement parameter of the face and a rotation direction of the head between frames by utilizing a coordinate change of each landmark of the 2D face in continuous frame of images of the real-time video and the Euler rotation data or the quaternion rotation data of the head.

12. The method for real-time control of a three-dimensional model according to claim 1, wherein the actual object comprises a body, a head or a face, and the marking comprises capturing and analyzing an action of the body or the head or a facial expression.

13. The method for real-time control of a three-dimensional model according to claim 1, further comprising:

invoking the corresponding 3D model obtained; and controlling the corresponding 3D model to complete an action according to the action control instruction received.

14. A method for real-time control of a three-dimensional model, comprising:

capturing a real-time video of a head and a face in an actual object;

locating a face region by utilizing a low-resolution copy of frame of images in the real-time video;

applying directly the face region on a corresponding copy of an adjacent frame of images;

marking a face landmark in the face region of the frame of images or the corresponding copy;

establishing a head orientation reference pattern, a face reference planar and a face reference pattern of the face reference planar by utilizing a position fixed landmark of a front view 2D face in an image, and forming a coordinate map relationship with a front view 3D head model;

capturing rotation data of a head by measuring deformation of the head orientation reference pattern relative to the face reference pattern when the head of the adjacent frame of images is rotating; and forming a control instruction of an action expression of the head and the face in combination with a position change of a 2D face landmark of adjacent frames and the rotation data of the head.

15. A system for real-time control of a three-dimensional model, comprising:

a video capturing device (10), configured to obtain a real-time video of an actual object;

an image marking device (20), configured to mark an action of the actual object in an image of the real-time video;

an action instruction generating device (30), configured to form an action control instruction of a corresponding 3D model according to a change of the action that is marked; and a synchronization outputting device (40), configured to synchronize audio data and the action control instruction and output, wherein the synchronization outputting device (40) comprises an audio data synchronizing device (35), a control instruction synchronizing device (36) and a real-time outputting device (37), wherein the audio data synchronizing device (35) is configured to add a corresponding time label for the audio data according to a time label of a control instruction;

the control instruction synchronizing device (36) is configured to add a time label in units of frames for the control instruction of a head of a 3D model; and the real-time outputting device (37) is configured to adapt the control instruction and an audio data signal to a transmission link, and output in real-time.

16. The system for real-time control of the three-dimensional model according to claim 15, wherein the image marking device (20) comprises an object recognizing device (21), an object landmark recognizing device (22), an object position coordinate establishing device (23) and an object action change recording device (24), wherein:

the object recognizing device (21) is configured to recognize the actual object in the image of the real-time video according to a preset object recognition strategy;

the object landmark recognizing device (22) is configured to recognize a landmark of the actual object in the image according to a preset landmark recognition strategy;

the object position coordinate establishing device (23) is configured to form a planar coordinate space of the landmark and a stereoscopic coordinate space of the corresponding 3D model; and the object action change recording device (24) is configured to measure a coordinate change of the landmark in the planar coordinate space in continuous images, and recording a corresponding coordinate change of the landmark in the stereoscopic coordinate space in the continuous images.

17. The system for real-time control of the three-dimensional model according to claim 16, wherein the object recognizing device (21) comprises an original image capturing device (41), an image copy generating device (42) and a copy cycle calibrating device (43), wherein the original image capturing device (41) is configured to obtain a frame of an original image M0 of the real-time video;

the image copy generating device (42) is configured to generate a set of original image copies: M1, M2 . . . Mm−i, . . . Mm−1, Mm, with diminishing resolution, according to a diminishing sampling rate; and the copy cycle calibrating device (43) is configured to perform sequentially a face region calibration in original image copies by using the number m of the original image copies as the number of cycles and starting from an original image copy Mm with a lowest resolution, and form calibration data of the face region.

18. The system for real-time control of the three-dimensional model according to claim 16, wherein the object landmark recognizing device (22) comprises a landmark calibrating device (48), configured to perform a face landmark calibration in a face region calibrated by an original image copy Mm−i, and/or subsequent original image copies (Mm−i ... M2, M1), and/or the original image M0, and form calibration data of the face landmark with difference in accuracy.

19. The system for real-time control of the three-dimensional model according to claim 16, wherein the object recognizing device (21) comprises a face region calibrating device (51), a continuous frame processing device (52), a continuous frame region calibrating device (53), a copy region calibration judging device (54) and an original region calibrating device (55), wherein
the face region calibrating device (51) is configured to obtain calibration data of a face region of a corresponding original image copy Mm−i and an original image M0;
the continuous frame processing device (52) is configured to obtain an original image M0 of frame of images of a subsequent continuous duration and a corresponding original image copy Mm−i;
the continuous frame region calibrating device (53) is configured to complete a face region calibration of the original image M0 of frame of images of the subsequent continuous duration by utilizing the calibration data of the face region of the original image M0;
the copy region calibration judging device (54) is configured to complete a face region calibration of the original image copy Mm−i of frame of images of the subsequent continuous duration by utilizing the calibration data of the face region of the original image copy Mm−i; and
the original region calibrating device (55) is configured to perform a face landmark calibration in a face region calibrated by the original image copy Mm−i of subsequent various frames and/or the original image M0, and form calibration data of the face landmark with difference in accuracy.

20. The system for real-time control of the three-dimensional model according to claim 16, wherein the object recognizing device (21) comprises a face landmark calibrating device (62), a landmark outline generating device (63), an adjacent frame landmark calibrating device (64), an adjacent frame calibration judging device (65) and a landmark outline updating device (66), wherein
the face landmark calibrating device (62) is configured to calibrate a face landmark in a face region calibrated by a corresponding original image copy Mm−i or an original image M0 obtained;
the landmark outline generating device (63) is configured to form a bounding box range by utilizing an outline of the face landmark;
the adjacent frame landmark calibrating device (64) is configured to perform a face landmark calibration in the bounding box range by utilizing an expanded bounding box range as a face region of a next frame;
the adjacent frame calibration judging device (65) is configured to judge whether the face landmark calibration is successful, invoke the landmark outline updating device (66) if successful, and invoke the face landmark calibrating device (62) if unsuccessful; and
the landmark outline updating device (66) is configured to invoke the adjacent frame landmark calibrating device (64) after forming an updated bounding box range by utilizing the outline of the face landmark and scaling up the updated bounding box range.

21. The system for real-time control of the three-dimensional model according to claim 16, wherein the object position coordinate establishing device (23) comprises a head orientation reference generating device (71), a coordinate map generating device (72), a face reference generating device (73) and a rotation angle measuring device (74), wherein
the head orientation reference generating device (71) is configured to calibrate a 2D landmark of a front view face according to a face region calibration of the front view face in the image of the real-time video, and form a head orientation reference pattern by utilizing a landmark with a relatively fixed position thereof;
the coordinate map generating device (72) is configured to form a front view triangle mesh corresponding to a 3D head model according to the 2D landmark of the front view face in the image of the physical-time video, and form a coordinate map between the 2D landmark of a face and a 3D landmark of the 3D head model;
the face reference generating device (73) is configured to form a face reference planar and a face reference pattern of the face reference planar according to the 2D landmark with the relatively fixed position of the front view face; and
the rotation angle measuring device (74) is configured to form a perspective projection on the face reference planar by a 2D face calibrated a landmark in an adjacent frame of images of the real-time video, and obtain Euler rotation data or quaternion rotation data of a head according to deformation of the head orientation reference pattern relative to the face reference pattern of the face reference planar on the 2D face.

22. The system for real-time control of the three-dimensional model according to claim 16, wherein the object position coordinate establishing device (23) comprises a head and face action parameter generating device (32) and a control instruction generating device (33), wherein
the head and face action parameter generating device (32) is configured to form a landmark movement parameter of the face and a rotation direction of the head between frames by utilizing a coordinate change of each landmark of the 2D face in continuous frame of images of the real-time video and the Euler rotation data or the quaternion rotation data of the head; and
the control instruction generating device (33) is configured to encapsulate the landmark movement parameter and the rotation direction of the head into a control instruction of the head and face of a 3D model corresponding to a frame.

23. The system for real-time control of the three-dimensional model according to claim 15, wherein the action instruction generating device (30) comprises an action transforming device (31), configured to form an action control instruction of a 3D model corresponding to the actual object by utilizing the coordinate change of the landmark.

24. The system for real-time control of the three-dimensional model according to claim 15, further comprising:
an activating device (80), configured to invoke the corresponding 3D model obtained; and
a broadcasting device (90), configured to control the corresponding 3D model to complete an action according to the action control instruction received.

* * * * *